US006581875B2

(12) United States Patent
Colarik (10) Patent No.: US 6,581,875 B2
(45) Date of Patent: Jun. 24, 2003

(54) ANCHORING SYSTEMS FOR AIRCRAFT ARRESTING NETS

(75) Inventor: David K. Colarik, Media, PA (US)

(73) Assignee: Engineered Arresting Systems Corporation, Aston, PA (US)

( * ) Notice: Subject to any disclaimer, the term of this patent is extended or adjusted under 35 U.S.C. 154(b) by 0 days.

(21) Appl. No.: 09/976,211

(22) Filed: Oct. 12, 2001

(65) Prior Publication Data

US 2003/0071169 A1 Apr. 17, 2003

(51) Int. Cl.[7] .................................................. B64F 1/00
(52) U.S. Cl. .............................. 244/110 C; 244/110 R; 256/12.5; 256/1
(58) Field of Search ........................ 244/114 R, 110 C, 244/110 E, 110 F, 110 G, 110 R; 114/261; 403/286, 292; 256/12.5, 13–14, 15, 19

(56) References Cited

U.S. PATENT DOCUMENTS

| | | | | | |
|---|---|---|---|---|---|
| 3,695,559 | A | * | 10/1972 | Cruger et al. | 244/110 C |
| 3,810,595 | A | * | 5/1974 | Doolittle | 244/110 C |
| 3,827,660 | A | * | 8/1974 | Doolittle | 244/110 C |
| 3,876,170 | A | * | 4/1975 | Whittingham | 244/110 C |
| 4,102,518 | A | * | 7/1978 | Bernard et al. | 244/110 C |
| 4,147,317 | A | * | 4/1979 | Mayhew et al. | 244/110 C |
| 4,304,320 | A | * | 12/1981 | Hull | 188/371 |
| 4,679,369 | A | * | 7/1987 | Kinsley et al. | 244/110 C |
| 4,979,701 | A | | 12/1990 | Colarik et al. | |
| 5,961,099 | A | * | 10/1999 | Thommen, Jr. | 256/12.5 |
| 6,098,750 | A | * | 8/2000 | Reynolds et al. | 182/112 |
| 6,186,274 | B1 | * | 2/2001 | Reynolds et al. | 182/112 |
| 6,382,869 | B1 | * | 5/2002 | Dickinson | 404/6 |

* cited by examiner

Primary Examiner—Peter M. Poon
Assistant Examiner—T. D. Collins
(74) Attorney, Agent, or Firm—Kenneth P. Robinson (57) ABSTRACT

Anchoring systems for aircraft arresting nets utilize frangible anchor links around lower horizontal straps of each net element of a composite arresting net. Each anchor link may be formed from flexible plastic sheet material, with openings through which an anchor cable passes and is secured to a runway surface by an anchor retainer. The anchor links provide ease of anchoring system assembly in the field and retain the bottom of the arresting net in proper position prior to engagement of the arresting net by an aircraft overrunning the runway. When an aircraft engages the net, the anchor links break to permit the net to conform to and safely stop the aircraft. Each anchor link may be perforated in its central portion or otherwise formed or specified to provide suitable frangibility in an arresting incident.

27 Claims, 13 Drawing Sheets

FIG. 1

PRIOR ART

FIG. 2

PRIOR ART

ANCHORING SYSTEMS FOR AIRCRAFT ARRESTING NETS

RELATED APPLICATIONS (Not Applicable)

FEDERALLY SPONSORED RESEARCH (Not Applicable)

BACKGROUND OF THE INVENTION

This invention relates to arresting nets used to arrest travel of aircraft overrunning runways and, more particularly, to arrangements for frangibly securing arresting nets in position across a runway.

Aircraft arresting nets are used to arrest forward motion of aircraft. For example, an aircraft which, when landing, fails to stop before the end of an operative landing surface, creating an emergency situation. In addition to stopping the aircraft, objectives are to avoid injury to persons aboard the aircraft and avoid or minimize damage to the aircraft. To meet these objectives an arresting net (which is typically a composite of many net elements) is stretched across the end of a runway. Upper and lower horizontal straps supporting vertical straps are connected to energy absorbing mechanisms at the sides of the runway to decelerate and stop and aircraft. Form, construction and operation of arresting nets are described in the present inventor's U.S. Pat. No. 4,979,701, issued Dec. 25, 1990, (the '701 patent) which is hereby incorporated by reference herein.

For effective use, an arresting net must be stretched across a runway end, with vertical straps extended and with the lower edge of the net anchored in proper position to enable an aircraft to properly engage the net.

Figure 1:
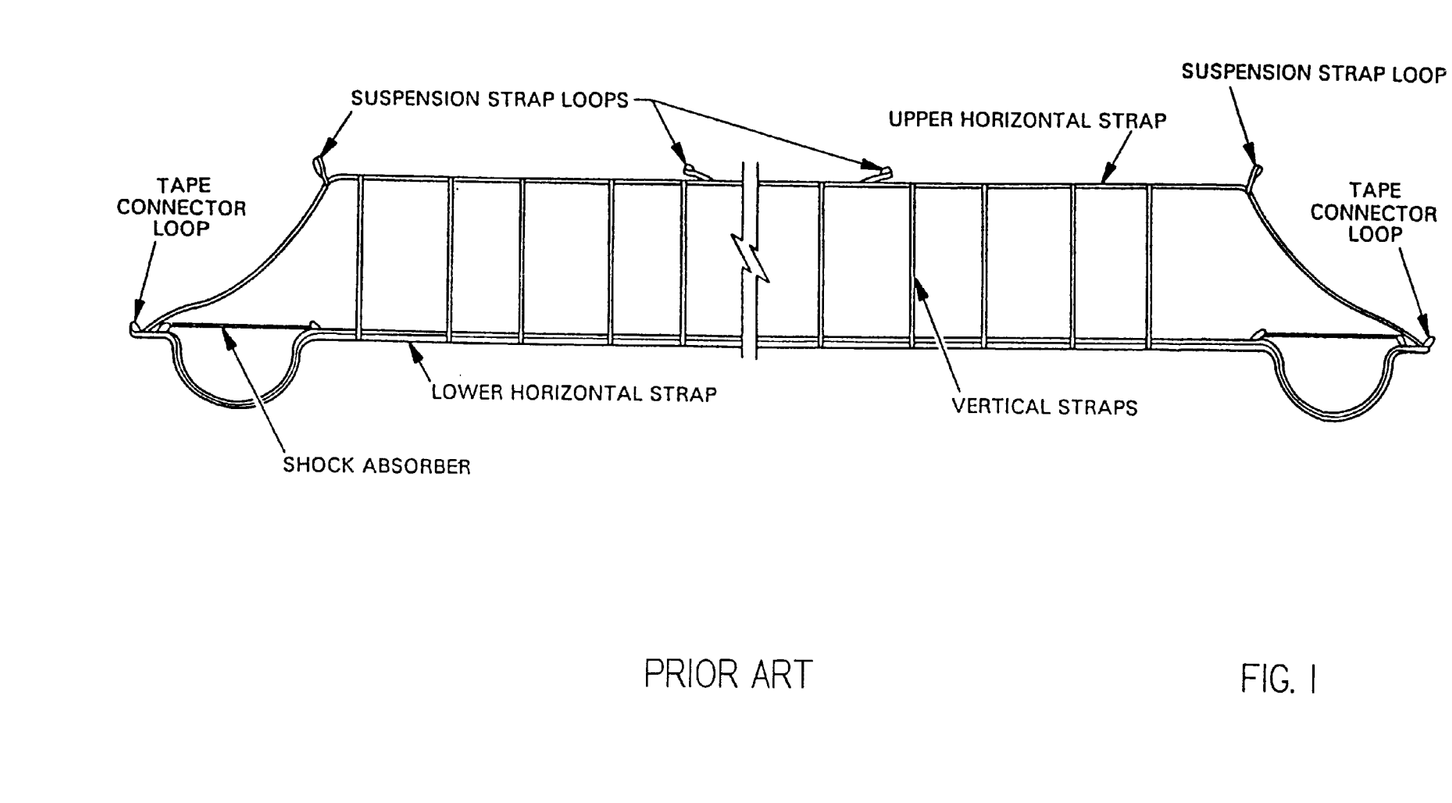
FIG. 1 shows a prior art net element for use in an aircraft arresting net.
Figure 2:
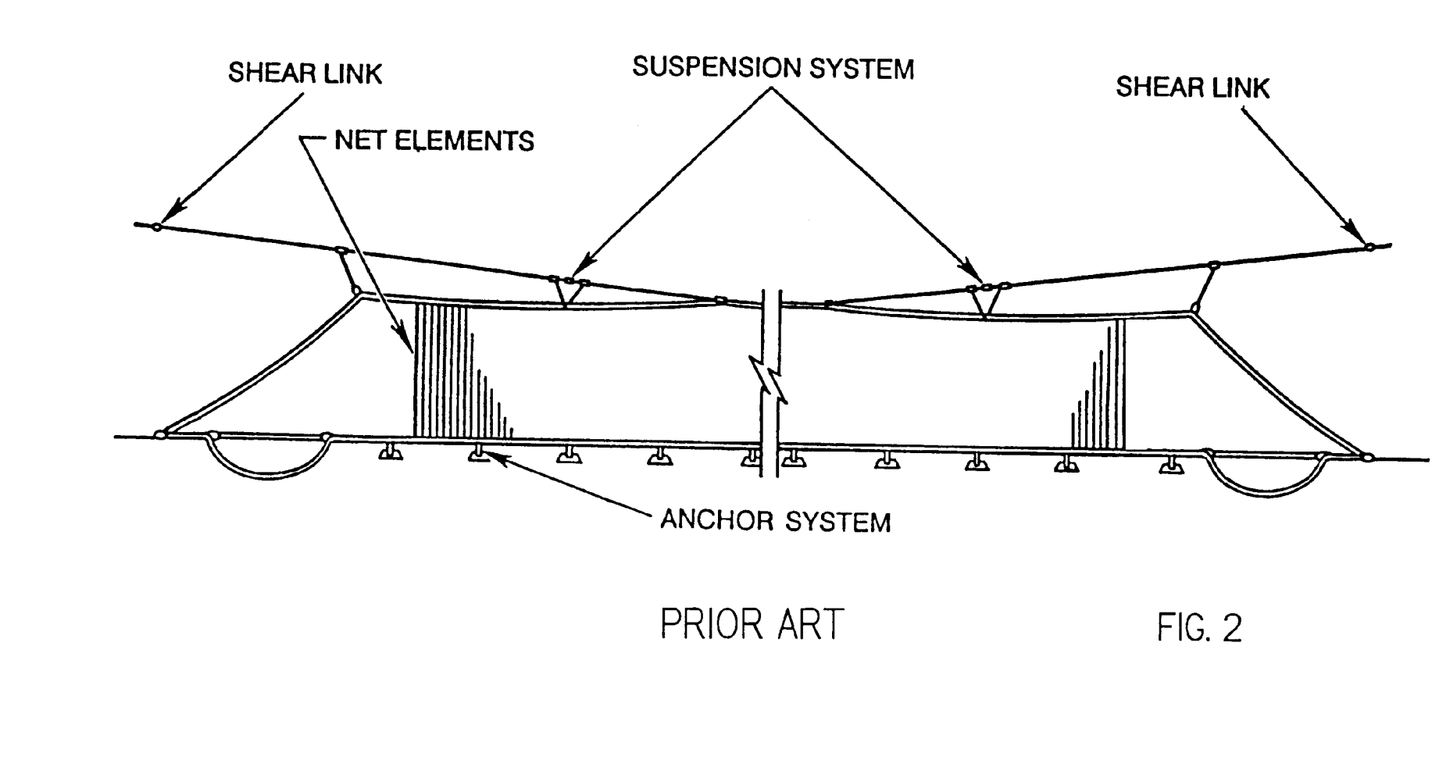
FIG. 2 shows a prior art arresting net installed across a runway.
Figure 3:
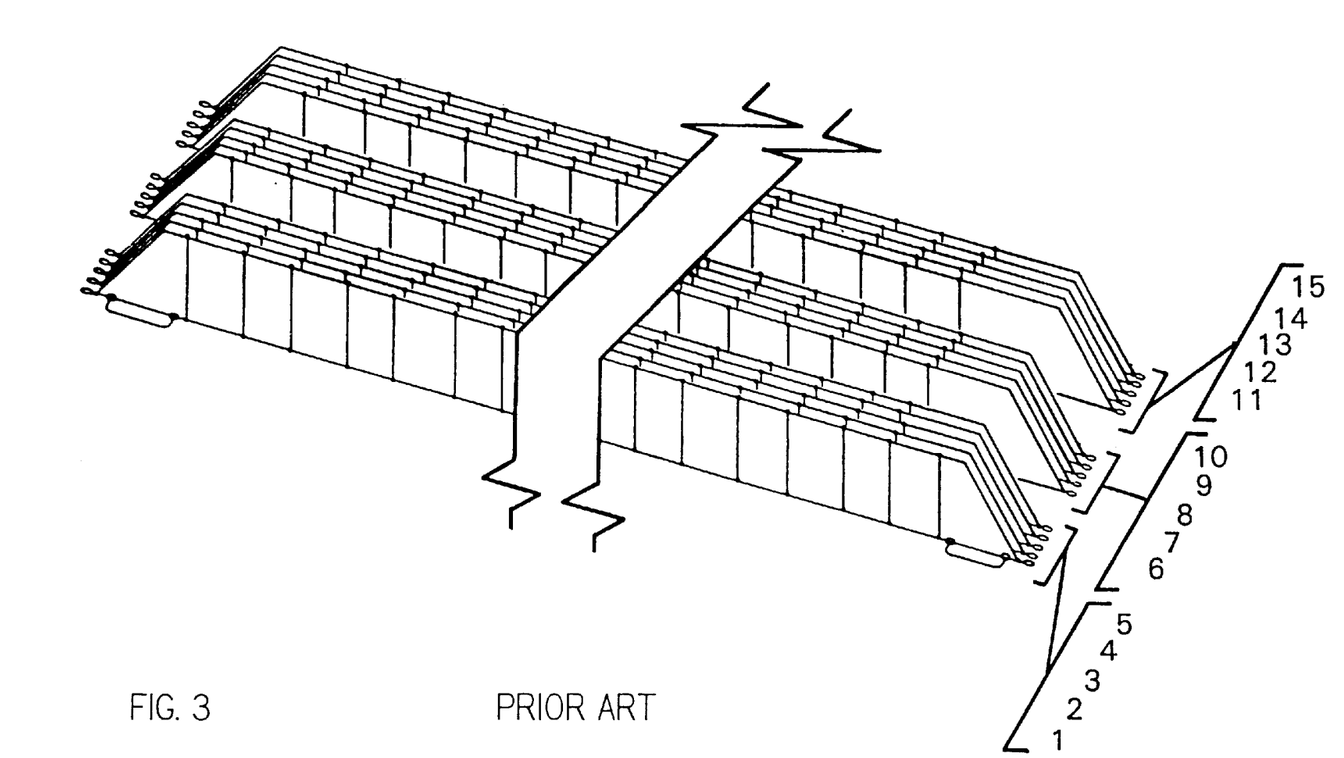
FIG. 3 shows the complement of individual net elements which may be used in the FIG. 2 arresting net.

FIG. 1 shows an example of a prior net element (e.g., spread out on a flat surface). FIG. 2 is a simplified view of a composite arresting net as positioned across a runway and including an upper suspension cable and lower anchoring arrangement. The suspension cable and anchoring arrangement are employed to position the arresting net and to break upon aircraft impact with the net, so that the horizontal and vertical straps of the net engage and decelerate the aircraft. FIG. 3 provides a simplified spread view of fifteen individual net elements, which together may comprise the arresting net represented in FIG. 2.

Figure 4:
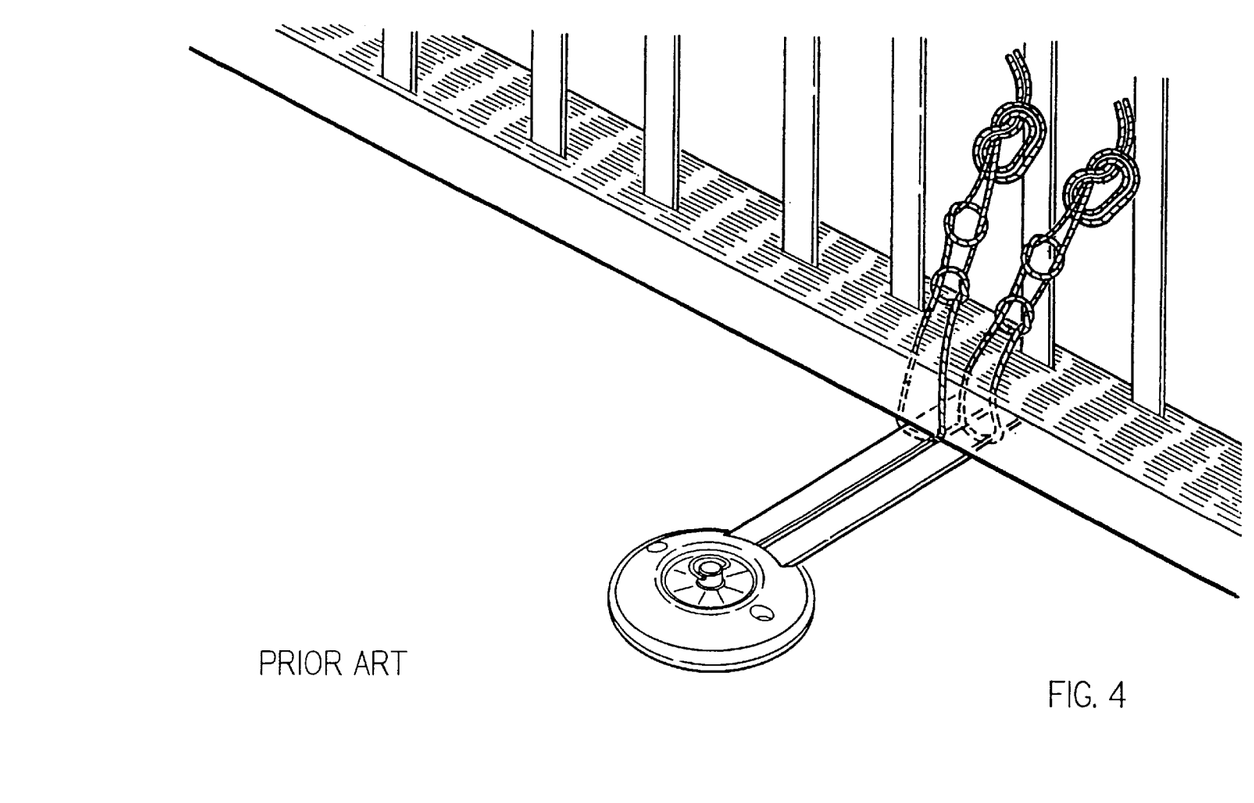
FIG. 4 shows horizontal straps of an arresting net fastened to an anchor strap by prior art use of knotted lacing cords.
Figure 5:
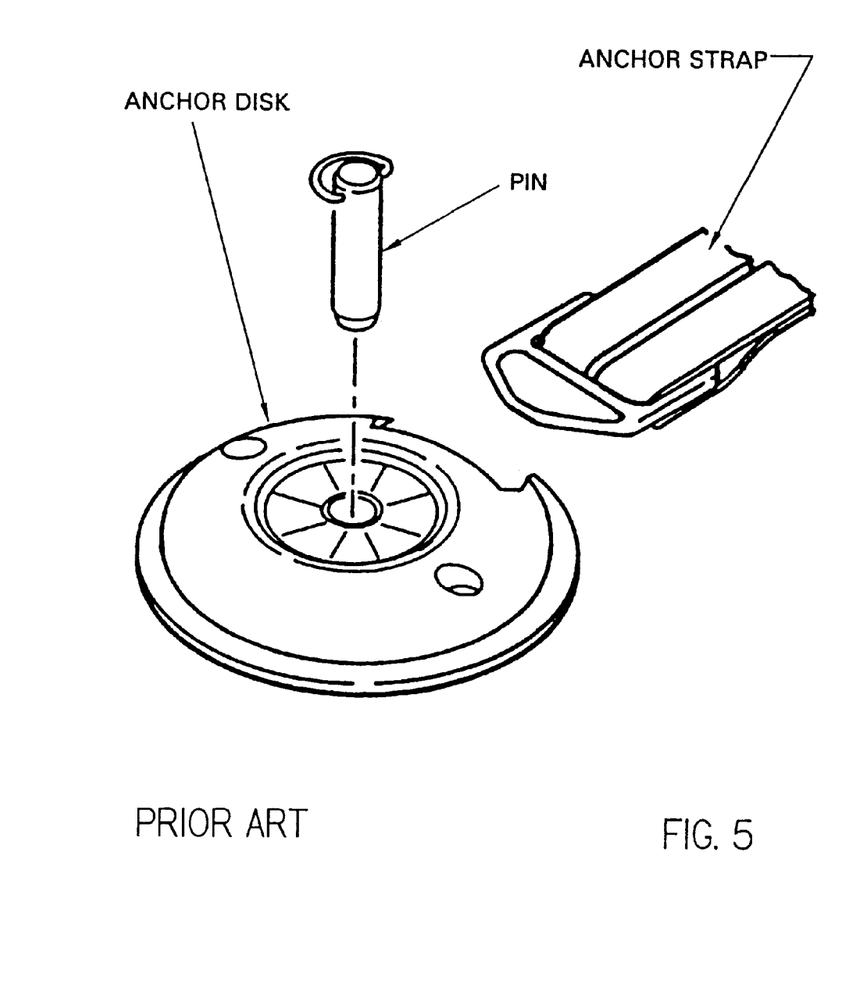
FIG. 5 shows details of attachment of the FIG. 4 anchor strap to an anchor disk affixed to a runway.

As noted, it is desirable to anchor the arresting net to the runway when it is installed and positioned for emergency use as may be required. FIG. 4 illustrates a prior arrangement whereby each bottom strap of an arresting net is secured to a heavy anchor strap, shown lying on a runway surface, by an individual piece of lacing cord (e.g., light nylon line) which is knotted to remain in position. FIG. 5 shows further detail indicating how a D-ring at the end of the anchor strap is inserted into an anchor disk affixed to the runway surface and secured by insertion of a pin into the anchor disk and through the D-ring. An arresting net may, for example, utilize 17 anchor disk, anchor strap combinations at spaced positions across a runway, with each of two bottom straps of each of 15 net elements individually tied by lacing cord to each anchor strap. As indicated, upon aircraft impact the lacing cords break and the horizontal and vertical arresting net straps stop the aircraft under control of the energy absorbing mechanisms.

This use of lacing cord to anchor the lower arresting straps is effective in appropriate deployment of the arresting net. However, in this example net anchoring requires that 510 pieces of lacing cord be manually and individually positioned and tied. This effort, which may require 4 to 8 man-hours to complete, must be performed upon net installation, again following each aircraft arresting incident and possibly also on a routine preventive maintenance basis. In addition to this level of effort, proper installation and execution of each knot to specification (e.g., as to type and placement of cord and knot) and inspection thereof can be a matter of concern.

Accordingly, objects of the present invention are to provide new and improved anchoring systems for aircraft arresting nets, and such anchoring systems which may have one or more of the following characteristics and capabilities:

reliable net anchoring;

predetermined frangibility in arresting incidents;

ease of installation and replacement;

simplified, time effective installation;

durable reusable components; and low cost expendable components.

SUMMARY OF THE INVENTION

In accordance with the invention, an anchoring system, to secure a member of an aircraft arresting net to a runway, may include a frangible anchor link, an elongated anchor element and an anchor retainer. The frangible anchor link, which may have the form of a strip of sheet plastic or other material, includes a central portion positionable at least partially around the net member and end portions each having at least one opening. The elongated anchor element, which may have the form of an anchor cable, has two ends and is positionable through each end portion of the anchor link via at least one opening therein. The anchor retainer is affixable to a runway to releasably secure the anchor element to the runway. The anchoring system may also include an anchor end-piece to releasably secure at least one end of the anchor element to the anchor retainer.

For a better understanding of the invention, together with other and further objects, reference is made to the accompanying drawings and the scope of the invention will be pointed out in the accompanying claims.

DESCRIPTION OF THE INVENTION

Figure 6:
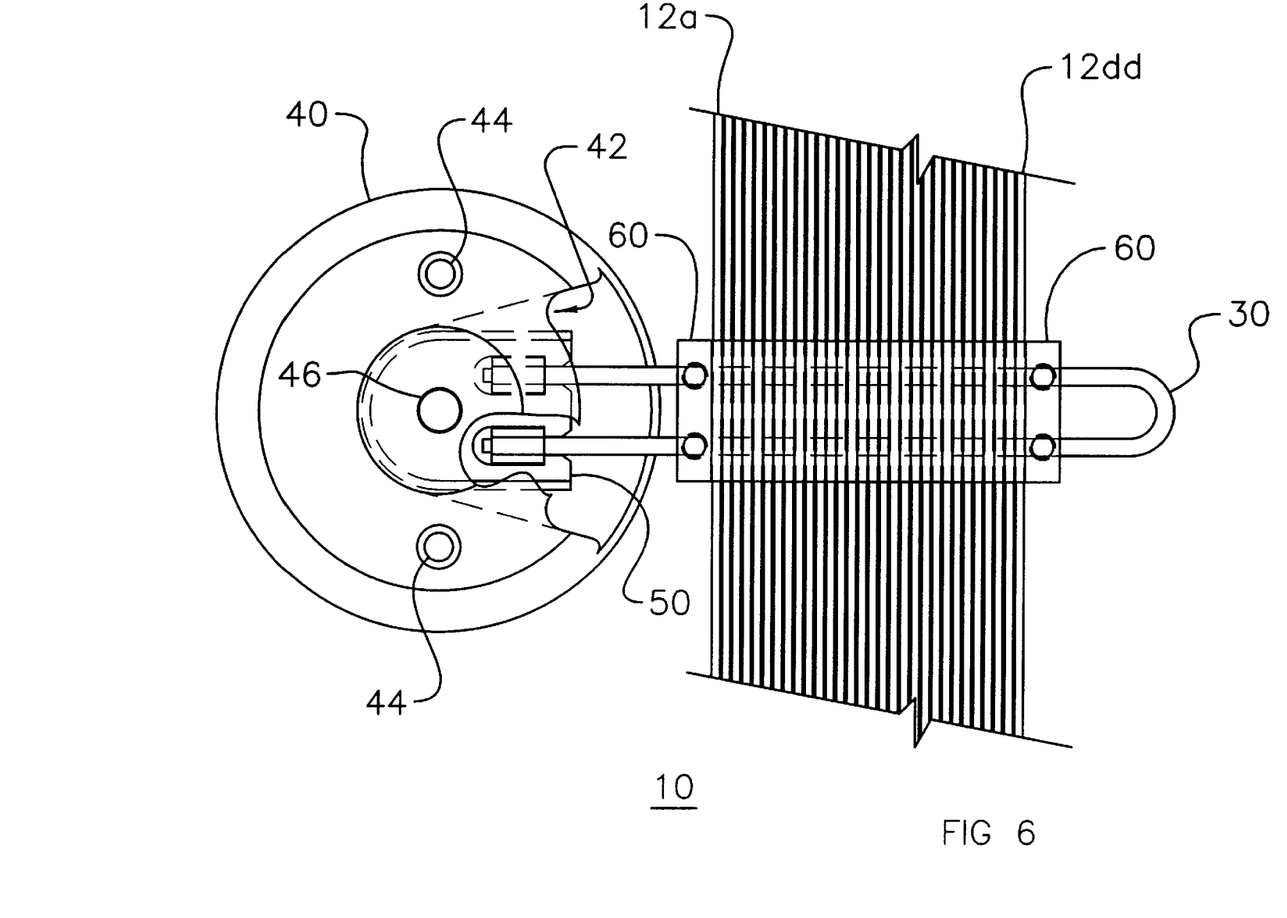
FIG. 6 is a plan view of an embodiment of an anchoring system pursuant to the invention.
Figure 7:
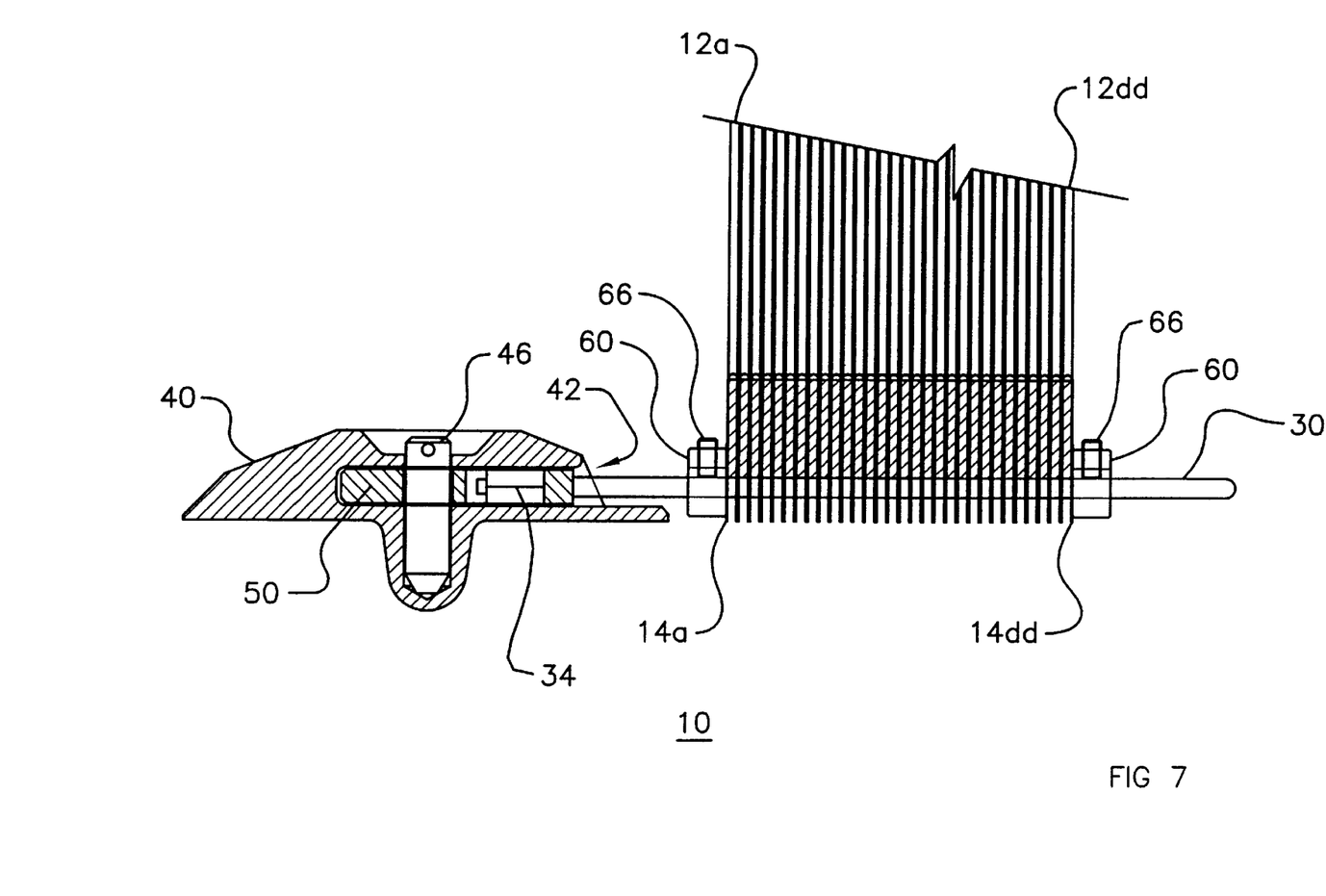
FIG. 7 is a side view of the FIG. 6 anchoring system shown partially in cross section.

With reference to FIGS. 6 and 7, there is illustrated an anchoring system 10 to secure a member of an aircraft arresting net. An arresting net may typically be made up of a plurality of individual net elements (e.g., 15 net elements of the type shown in FIG. 1). As described in the '701 patent, each individual net element may include two parallel bottom horizontal straps, so that, for 15 net elements there would be a total of 30 horizontal straps (e.g., lower transverse members to be positioned across a runway). Consistent with this, FIGS. 6 and 7 include portions of 30 lower transverse members 12a through 12dd, representing portions of 15 individual net elements of a complete arresting net. The anchoring system shown in FIG. 6 may typically be employed at 17 individual spaced locations along the lower transverse members of an arresting net across a runway.

Anchoring system 10 includes a separate frangible anchor link positionable at least partially around each of the net members 12a–12dd. As will be further described, each anchor link includes a central portion, which may be perforated and end portions, each having at least one opening. Each anchor link may, in a presently preferred embodiment, comprise reinforced and perforated plastic sheet material. FIG. 7 includes 30 anchor links 14a–14dd shown in side view in place on the net members 12a–12dd.

Figure 8A:
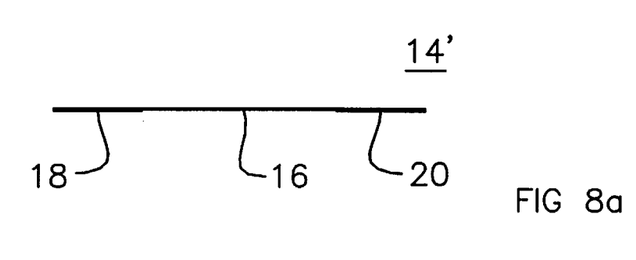
FIGS. 8a and 8b are side and plan views of an anchor link usable in the anchoring system of FIGS. 6 and 7.
Figure 8B:
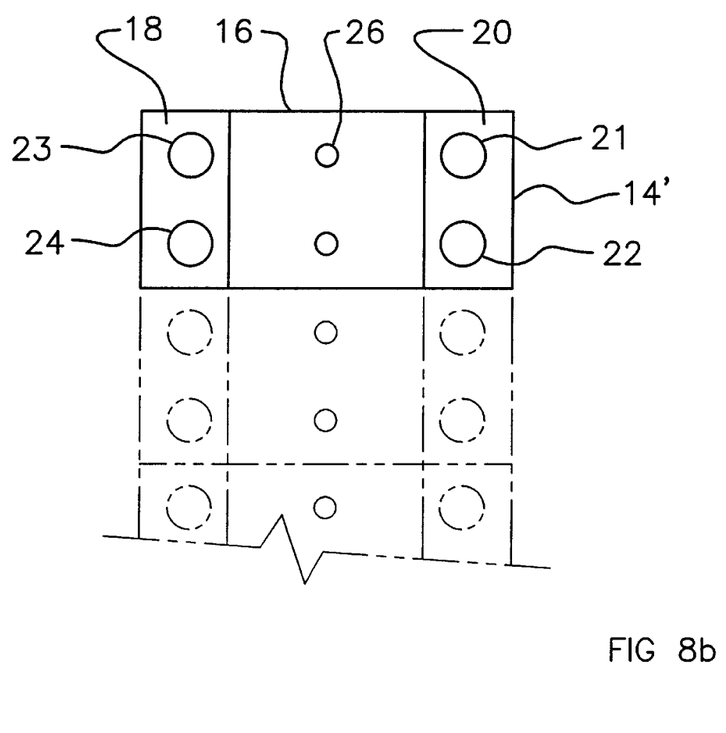
Figure 9:
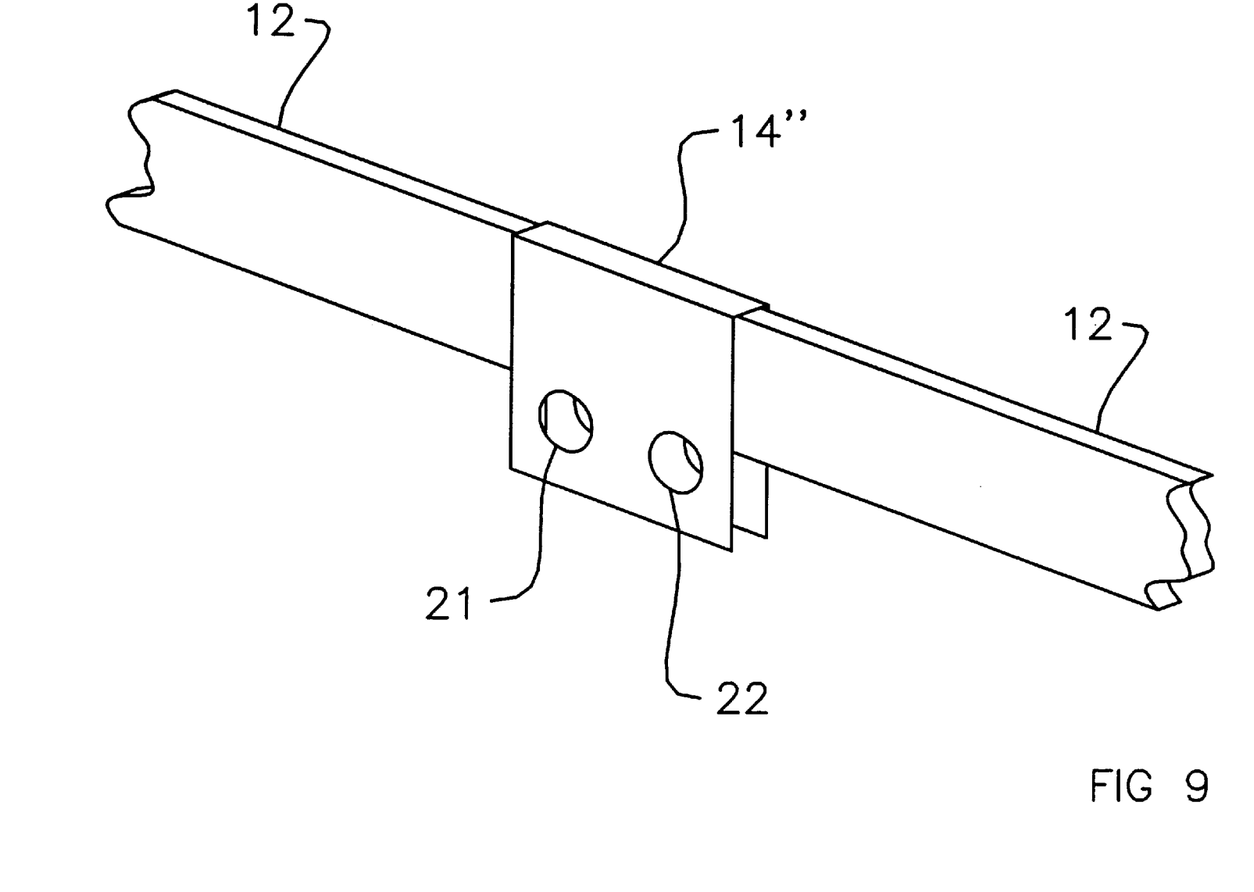
FIG. 9 is a simplified perspective view showing an anchor link positioned around a lower horizontal strap of a net element of an arresting net.

FIGS. 8a and 8b are respective side and plan views of a representative anchor link 14', which is also illustrated in modified form as anchor link 14" in FIG. 9 in position on a portion of a net member 12 (which represents any one of net members 12a–12dd of FIGS. 6 and 7). As shown in FIG. 8a, anchor link 14' consists of a section 16 of sheet material, with reinforcing strips 18 and 20 also of sheet material bonded or laminated to it along each end. As shown in FIG. 8b, in this example anchor link 14' includes openings 21 and 22 in its right end portion, openings 23 and 24 in its left end portion, and perforations (of which 26 is representative) in its central portion. As represented by dashed portions in FIG. 8b, one approach to production of these anchor links uses an extended length of the section 16 material bearing strips of the sections 18 and 20 material, which can then be cut into individual anchor links of appropriate width, with holes formed before or after cutting, as appropriate. In the embodiment shown, anchor link 14' of FIG. 8b has dimensions of nominally 2 inches by 4¼ inches, with nominal diameters of one-half inch for openings 21–24 and one-quarter inch for perforations 26. In this example, section 16 was formed of 1000 gauge black polyether polyurethane film of 85±5 shore hardness and nominal breaking strength of 6500 psi and sections 18 and 20 were formed of 2000 gauge black polyether polyurethane film of 90±=shore hardness and nominal breaking strength of 6500 psi.

A second, currently preferred embodiment of an anchor link is more particularly shown in FIG. 9. As illustrated, anchor link 14" may have the same length and width dimensions and openings 21–24 as shown in FIGS. 8a and 8b for anchor link 14'. However, central portion perforations 26 and reinforcing strips 18 and 20 may be omitted, as represented in FIG. 9. In this embodiment, anchor link 14" is formed of 2000 gauge black polyether polyurethane film of 90±5 shore hardness and nominal breaking strength of 6500 psi. In other portions of this description references to anchor link 14 will be understood to indicate inclusion of one or more anchor links of the configurations identified as 14' or 14" or any other suitable configuration. While any other suitable materials, form, dimensions, etc., may be employed for other embodiments of anchor links by skilled persons once having an understanding of the invention, it is desirable that anchor links be waterproof, resistant to outdoor exposure, including ultraviolet radiation, and stable over a temperature range of the order of −40° to +160° F.

In the anchoring system of FIGS. 6 and 7, anchor links 14 enable individual net elements and the complete arresting net to be anchored to a runway in periods between actual aircraft arresting incidents. When an arresting incident occurs, the anchor link must be frangible so that it breaks and permits the arresting net, after engagement by the aircraft, to move from its rest position and conform to and decelerate the aircraft. For this purpose, an anchor link 14 (e.g., anchor link 14' or 14" as described and specified above) may typically have a nominal breaking strength of 135±15 lb. By appropriate design and material selection, anchor links having suitable frangibility and other characteristics can be provided for a variety of arresting net applications and implementations. For example, perforations as at 26 may be included to increase frangibility and the central portion may be dimensioned to achieve appropriate frangibility or break strength.

Figure 10:
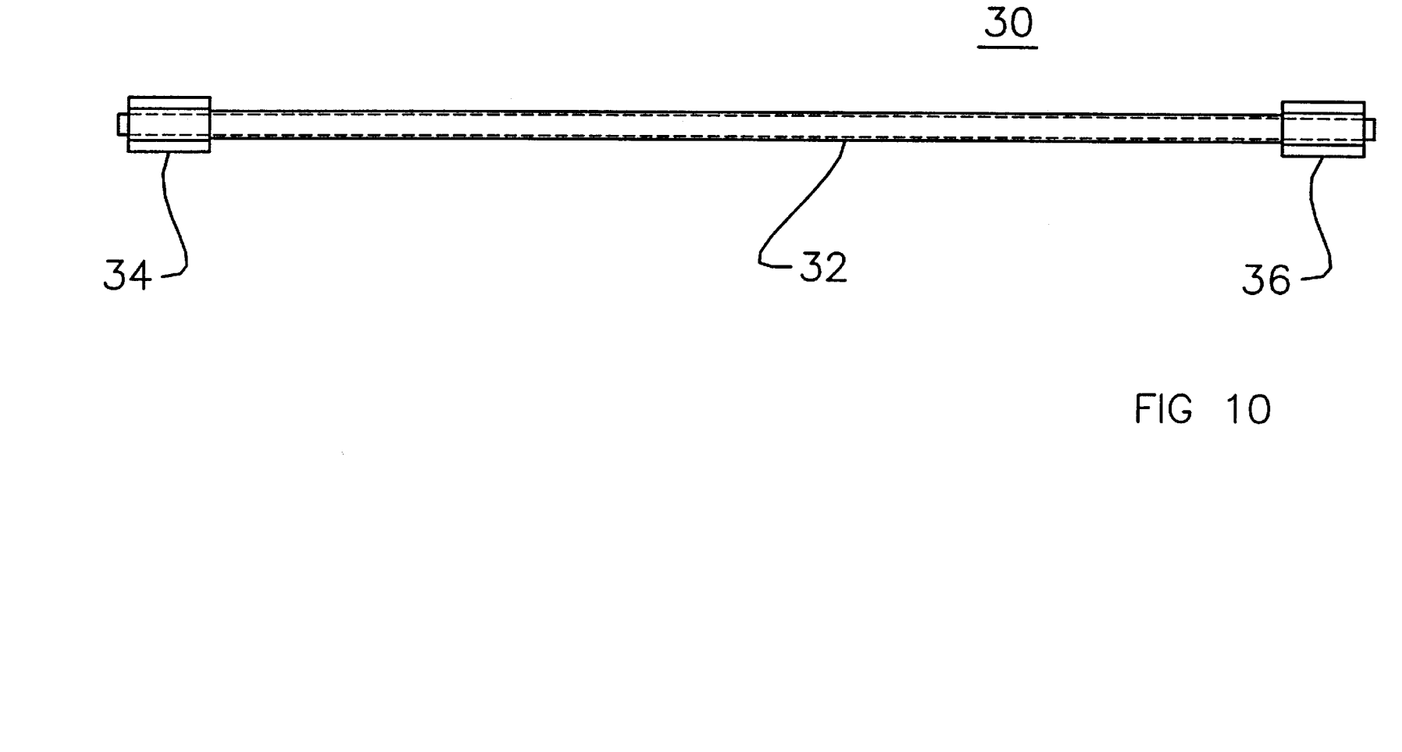
FIG. 10 shows an anchor element usable in the anchoring system of FIGS. 6 and 7.

FIG. 10 shows an elongated anchor element 30 suitable for use in the anchoring system of FIGS. 6 and 7. As shown, anchor element 30 is constructed as a section of flexible steel cable 32 with enlarged hexagonal metal end pieces or plugs 34 and 36 firmly attached. Anchor element 30 may, for example, be vinyl coated galvanized steel cable of nominal quarter inch outer diameter. End plugs 34 and 36 may be of circular cross-section, with an outer diameter suitable to permit passage through openings 21–24 of an anchor link 14, and may be affixed to the ends of cable 32 by swaging after removal of a portion of the vinyl coating. For present purposes, anchor element 30 may have a nominal end-to-end length of 20 inches.

The anchor system of FIGS. 6 and 7 also includes an anchor retainer 40 which is affixable to a runway surface to releasably secure anchor element 30 to the runway, either directly or by use of an anchor end-piece to be described. As shown, anchor retainer 40 has a disk-like form when mounted to a runway by use of mounting bolts 44 visible in top view in FIG. 6. Anchor retainer 40 includes a horizontally formed slot 42 configured to receive the ends of anchor element 30 (e.g., as held by an anchor end-piece). As illustrated in the cross-sectional FIG. 7 representation of anchor retainer 40, it includes a portion extending into the runway and configured to receive a steel pin 46 to secure anchor element 30 to the runway (via insertion through an end-piece, for example). The basic insertion and pin-retention combination is illustrated in FIG. 5 for insertion of a D-ring on a prior type of anchor strap into an anchor disk prior to insertion of a pin for retention purposes.

Figure 11A:
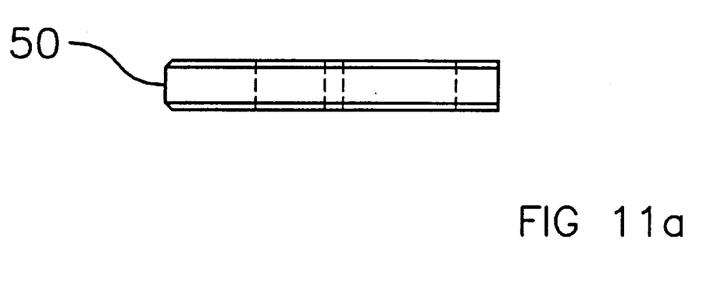
FIGS. 11a and 11b are side and plan views of an anchor end-piece usable in the anchoring system of FIGS. 6 and 7.
Figure 11B:
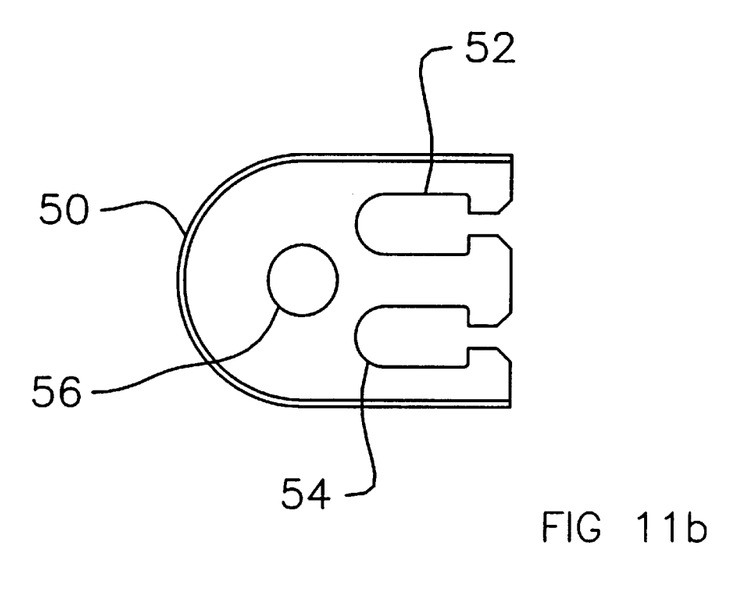

FIGS. 11a and 11b are side and plan views of an anchor end-piece 50 suitable for use in the anchoring system to secure the two ends of the anchor element 30 of FIG. 10. Anchor end-piece 50 may be produced from 0.44 inch thick steel stock. Shaped openings 52 and 54 are proportioned to receive end plugs 34 and 36 of anchor element 30 and prevent those plugs from being removed by horizontal movement of the plugs (e.g., movement of a plug to the left out of end-piece 40 as it is aligned in FIGS. 11a and 11b). At the same time, openings 52 and 54 do not prevent insertion or removal of end plugs 34 and 36 by movement perpendicular to the main surfaces of anchor end-piece 50 (e.g., movement of a plug up or down into or out of end-piece 50 as it is aligned in FIG. 11a). With reference to FIGS. 6, 7 and 5, it will be seen that end-piece 50 is proportioned to slide into a side opening 42 of anchor retainer 40, for retention therein by downward insertion of pin 46. With end piece 50 inserted into anchor retainer 40, the dimensions of anchor retainer 40 are effective to prevent vertical movement of end plugs 34 and 36 out of shaped openings 52 and 54. Provision and use of anchor end-piece 50 as shown and described represents a currently preferred embodiment. However, skilled persons may provide other designs suitable for particular applications or may configure an anchor cable and anchor retainer so as to permit direct insertion and retention of the anchor cable, without provision of a separate anchor end-piece, for example (see FIG. 13).

Figure 12A:
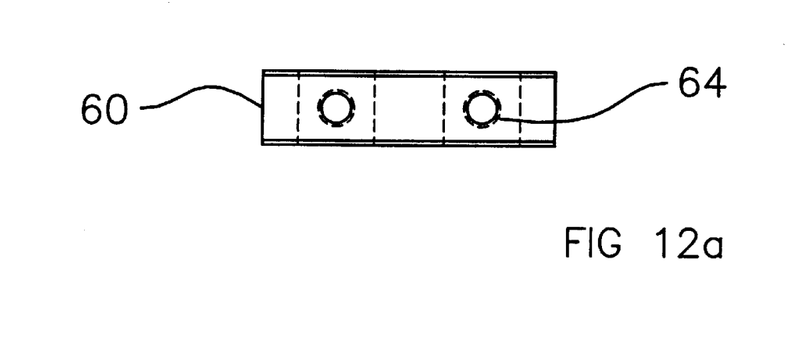
FIGS. 12a 12b and 12c are side, plan and end views of a clamping device usable in the anchoring system of FIGS. 6 and 7.
Figure 12B:
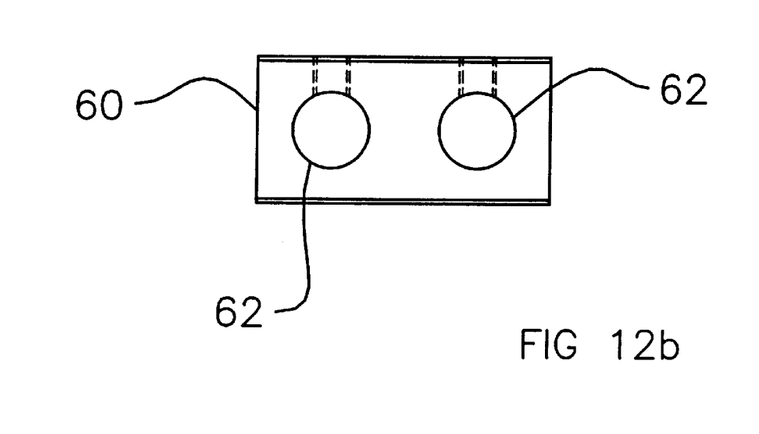
Figure 12C:
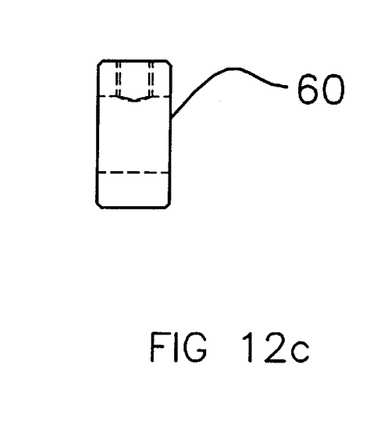

FIGS. 12a, 12b and 12c are side, plan and end views of a clamping device 60 suitable for use in the anchoring system of FIGS. 6 and 7. Clamping device 60 includes openings 62, which are large enough to permit passage of end plugs 34 and 36 of anchor element 30. Threaded holes such as 64 are provided to permit insertion of set screws. As shown in FIG. 7, set screws 66 positioned in the threaded holes can be tightened against an anchor cable 30 inserted through openings 62 after clamping devices 60 are put in place to hold the anchor links 14 in position.

Assembly of the anchor system 10 in the field can be carried out efficiently, by simple straightforward steps. First, for a 15 element arresting net of the type described, one of the anchor links 14a–14dd is positioned over each of the 30 lower transverse strap members, with the end portions hanging down as in FIG. 7 and the openings 21–24 therein approximately aligned with corresponding openings in the other anchor links. Then a first clamping device 60 is placed on the anchor element 30, whose ends are then threaded through the openings in each of the anchor links 14a–14dd. A second clamping device 60 follows the anchor links on anchor element 30, whose ends bearing end plugs 34 and 36 are then put into openings 52 and 54 of end-piece 50. End-piece 50 is inserted into slot 42 of anchor retainer 40 and pin 46 is inserted to releasably secure the anchor element 30 to the runway, via use of end-piece 50 held by anchor retainer 40. This assembly procedure is then completed for each of the other anchoring positions along the arresting net across the runway.

Figure 13:
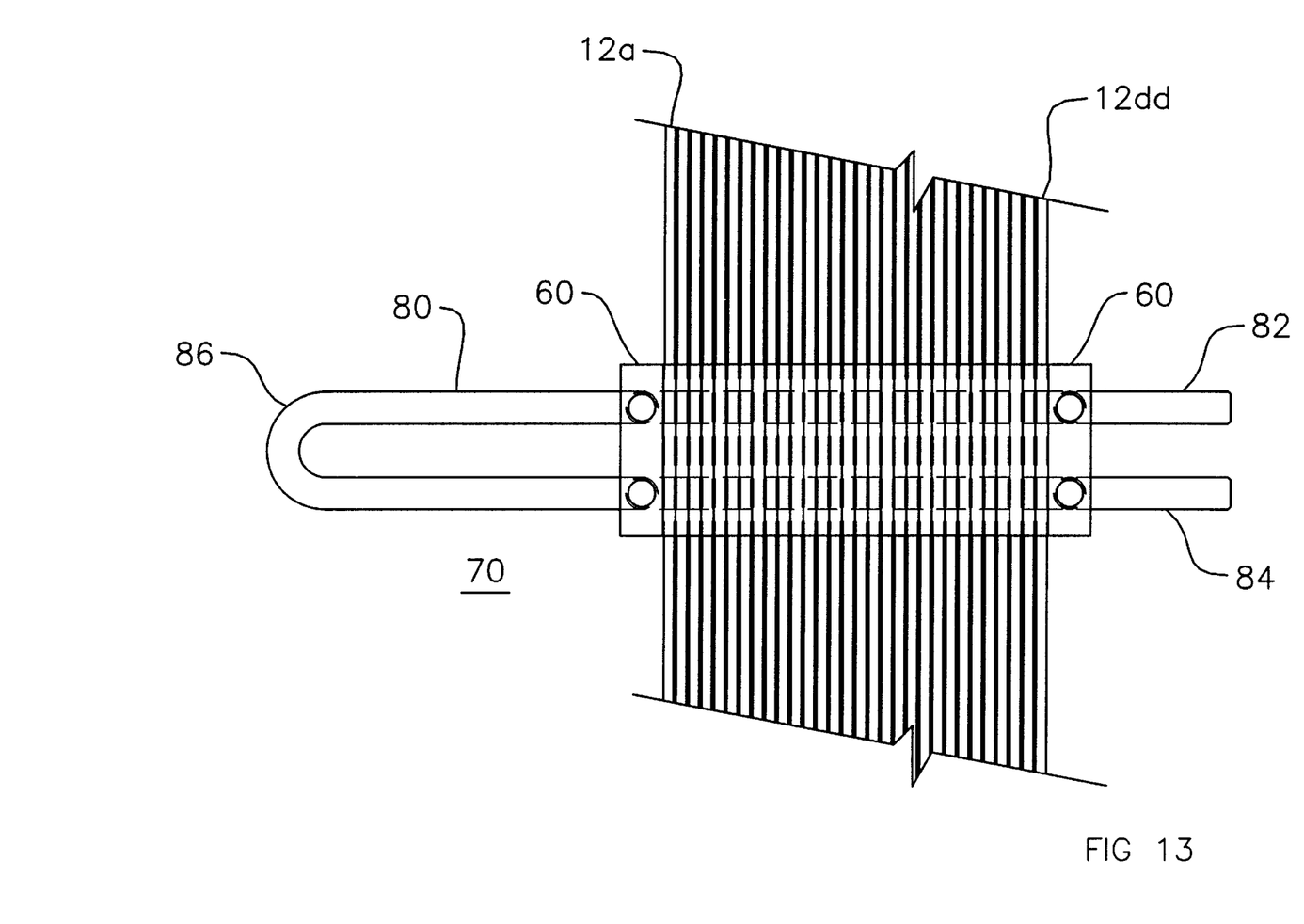
FIG. 13 is a plan view of a second embodiment of an anchoring system pursuant to the invention.

Referring now to FIG. 13, there is shown a plan view of a second embodiment of an anchoring system 70. FIG. 13 is generally similar to FIG. 6, showing portions of 30 lower horizontal straps 12a–12dd of an arresting net, an anchor cable 80 passing beneath strap portions 12a–12dd (through anchor links which are not visible in this view) and clamping devices 60 mounted on the anchor cable adjacent the anchor links. While not shown, a side view of anchoring system 70 of FIG. 13 would resemble the FIG. 7 system, except for the portions of cable 30 extending outward from clamping devices 60 in FIG. 7. Thus, anchor links 14a–14dd would appear as in FIG. 7, with cable portions extending through them. Differences between the system 70 of FIG. 13 and system 10 of FIGS. 6 and 7 will now be described.

The anchoring system of FIG. 13 includes an elongated anchor element 80, shown as a section of vinyl coated flexible steel cable, which extends through anchor links (e.g., as illustrated for anchor cable 30 and anchor links 14a–14dd of FIG. 7) and adjacent clamping devices 60. To the right in FIG. 13, the bare ends 82 and 84 of cable 80 extend outward from the points at which they are securely clamped by the right side clamping device 60. To the left in FIG. 13, the portion of cable 80 extending outward from the left side clamping device 60 forms a closed loop-end 86. In this configuration, loop-end 86 is formed so that it may be inserted directly into an anchor retainer affixed to a runway. Thus, loop-end 86 may, for example, be inserted into slot 42 of anchor retainer 40 of FIG. 7 and secured in place by insertion of pin 46, as previously described. While anchoring system 10 of FIGS. 6 and 7 employing end-piece 50 is the presently preferred embodiment, system 70 of FIG. 13 or further variations thereof may be utilized to provide anchoring of an arresting net, while providing simplified construction not requiring inclusion of plug ends (e.g., plug ends 34 and 36 of FIG. 10) or use of an anchor end-piece (e.g., end-piece 50 of FIG. 11b).

Operatively, anchoring systems pursuant to the invention provide what may be termed two modes of operation. First, after installation and in the absence of an aircraft arresting incident, the anchoring system holds the bottom of the arresting net in position to enable an overrunning aircraft to properly engage the net. Second, in an aircraft arresting incident, the frangible anchor links are designed to break under predetermined stress conditions, so as to release or de-anchor the net for proper deployment during aircraft arrestment.

While there have been described the currently preferred embodiments of the invention, those skilled in the art will recognize that other and further modifications may be made without departing from the invention and it is intended to claim all modifications and variations as fall within the scope of the invention.

What is claimed is:

1. An anchoring system, to secure a lower transverse member of an aircraft arresting net to a runway, comprising:
    a frangible anchor link including a central portion positionable at least partially around the lower transverse member and end portions each having at least one opening existing prior to the anchor link being so positioned;
    an anchor cable having two ends and positionable through each said end portion via at least one said opening; and
    an anchor end-piece arranged to secure the two ends of the anchor cable.

2. An anchoring system as in claim 1, wherein the anchor link comprises a length of frangible material and said at least one opening comprises at least one aperture penetrating said material.

3. An anchoring system as in claim 1, wherein said central portion of the anchor link is perforated for increased frangibility.

4. An anchoring system as in claim 1, additionally comprising:
    an anchor retainer affixable to the runway to releasably secure the anchor end-piece to the runway.

5. An anchoring system as in claim 1, additionally comprising:
    at least one clamping device to position the anchor link on the anchor cable.

6. An anchoring system as in claim 1, wherein said anchor cable is a section of steel cable.

7. An anchoring system as in claim 1, wherein said anchor cable is configured with enlarged end portions.

8. An anchoring system as in claim 7, wherein said anchor end-piece is configured to enable insertion and retention of said enlarged end portions.

9. An anchoring system as in claim 8, additionally comprising:
an anchor retainer affixable to the runway to releasably secure the anchor end-piece.

10. An anchoring system, to secure a member of an aircraft arresting net to a runway, comprising:
a frangible anchor link including a central portion positionable at least partially around said member and end portions each having at least one opening, existing prior to the anchor link being so positioned;
an elongated anchor element having two ends and positionable through at least one said opening; and
an anchor retainer affixable to the runway to releasably secure the said anchor element to the runway.

11. An anchoring system as in claim 10, wherein the anchor link comprises a strip of frangible plastic sheet material.

12. An anchoring system as in claim 10, wherein the central portion of the anchor link is perforated for increased frangibility.

13. An anchoring system as in claim 10, additionally comprising:
an anchor end-piece configured to releasably secure at least one portion of the elongated anchor element to the anchor retainer.

14. An anchoring system as in claim 10, additionally comprising:
at least one clamping device to position the anchor link on the elongated anchor element.

15. An anchoring system as in claim 10, wherein each end portion of the anchor link includes two holes sized to permit insertion of the elongated anchor element.

16. An anchoring system as in claim 10, wherein said elongated anchor element is a section of steel cable.

17. An anchor link, for use in an anchoring system to secure a lower member of an aircraft arresting net to a runway via an anchor cable, comprising:
a strip of thin frangible material having;
a central portion positionable at least partially around said lower member; and
two end portions each including at least one opening existing prior to the central portion being so positioned and sized to permit insertion of the anchor cable.

18. An anchor link as in claim 17, wherein the central portion includes at least one perforation to increase frangibility of the anchor link.

19. An anchor link as in claim 17, wherein each end portion includes two openings sized to permit insertion of the anchor cable.

20. An anchor link as in claim 19, wherein the central portion includes at least one perforation to increase frangibility of the anchor link.

21. An anchor link as in claim 17, wherein each end portion includes first and second openings and the anchor link is configured to permit one end of the anchor cable to be inserted through the first opening of each end portion and another end of the anchor cable to be inserted through the second opening of each end portion.

22. An anchor link as in claim 17, wherein said strip comprises a section of flexible plastic sheet material.

23. An anchor link as in claim 22, wherein each end portion includes a section of reinforcing material at least partially overlying said end portion.

24. An anchoring system, to secure a lower transverse member of an aircraft arresting net to a runway, comprising:
a frangible anchor link including a central portion positionable at least partially around the lower transverse member and end portions each including two holes;
an anchor cable having two ends with each end positionable through each said end portion via one of the two holes therein; and
an anchor end-piece arranged to secure the two ends of the anchor cable.

25. An anchoring system as in claim 24, wherein the anchor link comprises a length of frangible material and said holes penetrate said material.

26. An anchoring system as in claim 24, wherein said central portion of the anchor link is perforated for increased frangibility.

27. An anchoring system as in claim 24, wherein the anchor link comprises a strip of plastic sheet material.

* * * * *